(12) United States Patent
Zeng et al.

(10) Patent No.: US 8,509,115 B2
(45) Date of Patent: Aug. 13, 2013

(54) MULTICAST CONTROL METHOD IN ETHERNET PASSIVE OPTICAL NETWORK

(75) Inventors: Tao Zeng, Shenzhen (CN); Yunpeng Xie, Shenzhen (CN); Deqiang Wang, Shenzhen (CN)

(73) Assignee: ZTE Corporation (CN)

( * ) Notice: Subject to any disclaimer, the term of this patent is extended or adjusted under 35 U.S.C. 154(b) by 634 days.

(21) Appl. No.: 12/593,975

(22) PCT Filed: Dec. 24, 2007

(86) PCT No.: PCT/CN2007/003745
§ 371 (c)(1),
(2), (4) Date: Sep. 30, 2009

(87) PCT Pub. No.: WO2008/122173
PCT Pub. Date: Oct. 16, 2008

(65) Prior Publication Data
US 2010/0111529 A1    May 6, 2010

(30) Foreign Application Priority Data
Apr. 5, 2007 (CN) .......................... 2007 1 0091037

(51) Int. Cl.
*H04L 12/58* (2006.01)
(52) U.S. Cl.
USPC .......................................... 370/254; 370/392
(58) Field of Classification Search
USPC .............. 370/229, 230, 235, 254, 328, 389, 370/390, 392, 401, 422, 432, 475
See application file for complete search history.

(56) References Cited

U.S. PATENT DOCUMENTS
2005/0135365 A1   6/2005  Sung et al.
2006/0176835 A1 * 8/2006  Jang et al. .................... 370/270

FOREIGN PATENT DOCUMENTS
| CN | 1744570 A | 3/2006 |
| CN | 101051923 A | 10/2007 |
| EP | 1 670 280 A2 | 6/2006 |

OTHER PUBLICATIONS

Min Zhu et al.—"A Novel Implementation of VLAN-Based Multicast Carried on LLID in EPON", School of Communication and Information Engineering, Shanghai University Shanghai 200072, China. 4 Pages, 2002.
Chuanhao Zhang et al.—"Design of Controllable Multicast for IPTV over EPON", Proc. of SPIE vol. 6784 67811V-1. 8 Pages, 2002.
Laming Wei et al., Remote Multicast Replication (RMR) Protocol; <draft-wei-rmr-01.txt>, Dec. 2003. 14 Pages.
Supplementary European Search Report Dated Nov. 17, 2010, Application No. 07855755.0-2416 / 2139157, Applicant ZTE Corporation. 4 Pages.

* cited by examiner

*Primary Examiner* — Yemane Mesfin
*Assistant Examiner* — Mon Cheri Davenport
(74) *Attorney, Agent, or Firm* — Brooks Kushman, P.C.

(57) ABSTRACT

A multicast control method in an Ethernet passive optical network, the method includes steps: (A) configuring different id for user-end devices and their user ports; labeling users on office-end devices by using id for user-end devices and their user ports; setting up user's multicast authorization table; (B) based on the multicast authorization table, office-end devices control user's multicast authority; based on the controlled result, setting up multicast filtration tables and user filtration tables for user-end devices; based on the multicast filtration tables and user filtration tables, user-end devices filter multicast data, and forward them to users having multicast authority. The method controls multicast for different user ports on the same user-end device so as to raise security of multicast.

16 Claims, 2 Drawing Sheets

MULTICAST CONTROL METHOD IN ETHERNET PASSIVE OPTICAL NETWORK

TECHNICAL FIELD

The present invention relates to a communication multicast technology, and specifically, to a multicast control method in an Ethernet Passive Optical Network (EPON).

BACKGROUND

EPON is a broadband access network offering multiple comprehensive services based on a high-speed Ethernet platform and the Time Division Multiplexer (TDM) Media Access Control (MAC) by applying point-to-multipoint network structure and passive optical fiber transmission. EPON comprises the central office device, namely Optical Line Terminal (OLT), the user-end device, namely Optical Network Unit (ONU), and a connection link, namely Optical Distribute Network (ODN).

In recent years, with large-scale application of EPON technology, how to develop controllable multicast service in EPON is a topic worthy studying.

The existing EPON multicast control method applies single-copy broadcast, the multicast service distribution control point is set in the ONU, and a multicast authority table is set in the OLT to control the authority of the multicast, and the illegal multicast data are filtered through setting the items in the multicast filter table in the ONU. For the ONU with several user ports, the snooping function in Internet Group Management Protocol (IGMP) has the multicast service only forwarded to the user ports which request the service. However, the OLT can only identify the ONU ID in the prior art, and for ONU with several user ports, only different ONUs can be distinguished in the multicast authority table saved in the OLT in the prior art, while different user ports in the ONU cannot be distinguished.

For example, when the ONU receives at user port 1 the IGMP message with address 224.1.1.1 for entering into the multicast, a conversion table is established by L2 Switch through the present snooping mechanism, and the information of user port 1 is recorded in the conversion table; the ONU forwards the IGMP message including the ONU ID and said multicast address for entering into the multicast to the OLT, the OLT searches the multicast authority table saved in itself, and returns OAM (Operation, Administration, Maintenance) frame including the VLAN ID (Virtual Local Area Network ID) of the multicast and IP address of the multicast to the ONU if it finds out that the ONU has the authority of multicast; the ONU adds the VLAN ID and the IP address of said multicast into the multicast filter table. The ONU forwards the multicast data to the user port 1 in the conversion table established by said snooping mechanism after receiving the multicast data of said multicast. When the IGMP message with multicast address 224.1.1.1 for entering into the multicast is received at user port 2 in the ONU, the ONU uses the snooping mechanism to record the user port 2 into said conversation table as well, and thus the user port 2 can receive the multicast data with multicast address 224.1.1.1.

From the above description, it can be seen that the existing multicast control method only performs multicast control for the ONU while not for different user ports in the same ONU, thus users without the multicast authority may also receive the multicast data. The existing multicast control method cannot implement accurate multicast control and has security vulnerability in technology.

SUMMARY OF THE INVENTION

In view of this, the main objective of the present invention is to offer a method for controlling a multicast in EPON to implement multicast control for different user ports in the same user-end device, so as to improve accuracy and security of the multicast control.

In order to achieve the above objective, the main technical scheme of the present invention is:

The present invention provides a method for controlling a multicast in EPON, and the method comprises the following steps:

A, configuring different identities for a user-end device and its user ports; marking a user with a user-end ID and a user port ID in a central office device and setting a user's multicast authority table;

B, controlling a user's multicast authority in the central office device according to said multicast authority table; setting a multicast filter table and a user filter table in the user-end device according to a result of said controlling, and filtering by the user-end device multicast data and forwarding the filtered multicast data to a user with multicast authority according to said multicast filter table and user filter table.

Wherein, said step B specifically comprises:

B1, the user-end device receiving at a user port a request message carrying a multicast ID, adding the user-end device ID and said user port ID into the request message and then sending the request message to the central office device;

B2, the central office device receiving said request message and searching the multicast authority table, when the user marked by the user-end device ID and user port ID in said request message is found having the multicast authority, returning a multicast control frame carrying said multicast ID and said user port ID to the user-end device;

B3, after the user-end device receives said multicast control frame, according to the content of the multicast control frame, establishing and maintaining a multicast filter table including said multicast ID and a user filter table including said multicast ID and its corresponding user port ID;

B4, when the user-end device receives the multicast data, searching said multicast filter table and then, when the ID of the multicast to which the multicast data belong is recorded in said multicast filter table searching said user filter table, and forwarding the multicast data to the user port corresponding to the identity of said multicast ID recorded in the user filter table.

When said request message is a request message for entering into the multicast, said step B3 is: the user-end device obtaining the multicast ID and user port ID from said multicast control frame, establishing in the multicast filter table in the user-end device an item including the multicast ID, and establishing in the user filter table an item including said multicast ID and said user ports ID.

When said request message is a request for leaving the multicast, said step B3 is: the user-end device obtaining the multicast ID and user port ID from said multicast control frame, and deleting from said user filter table the item corresponding to said user port ID; searching said user filter table, judging whether there is the item corresponding to the multicast ID therein or not, if yes, performing step B4, otherwise, deleting from the multicast filter table the item corresponding to said multicast ID in, and performing step B4.

In the above scheme, said multicast control frame specifically comprises: a frame type information used to distinguish whether the message request is a request for entering into the multicast or leaving the multicast, a multicast VLAN ID, a multicast IP address and the user port ID. Wherein, the multicast ID in said multicast filter table is the multicast IP address; the multicast ID in said user filter table is the multicast VLAN ID and a MAC address mapped by the multicast IP address.

In the above scheme, said ID configured for the user-end device is a logic link ID; said ID configured for the user port is a custom VLAN ID. The setting multicast filter table and user filter table in the user-end device is: setting said multicast filter table in EPON media access control portion in the user-end device and setting the user filter table in a L2 Switch in the user-end device. Said user-end device is an optical network unit (ONU), and said central office device is an optical line terminal (OLT).

Since the method of the present invention uses the user-end device ID and user port ID to mark the user in the central office device to control the user's multicast authority; moreover, one-level multicast filter in the user-end device is modified to two-level filters: multicast filter and user filter, so as to implement multicast control for different user ports in the same user-end device, improve the accuracy and security of the multicast control. The present invention can be used by a plurality of kinds of user-end devices, and provides a more complete solution for EPON controllable multicast and extends the popularity of multicast service in EPON.

THE PREFERRED EMBODIMENTS OF THE PRESENT INVENTION

The present invention will be described in further detail in combination with the accompanying figures and embodiments.

The core technical scheme of the present invention is: configuring a user-end device and its user ports with different IDs; marking users with a user-end device ID and user port IDs in the central office device and set a user's multicast authority table; controlling a user's multicast authority in the central office device according to said multicast authority table, setting a multicast filter table and user filter table according to the controlling result in the user-end device, and the user-end device filtering and forwarding multicast data to the users having the multicast authority according to said multicast filter table and user filter table.

In the following embodiment, said user-end device is an ONU in EPON, said central office device is an OLT in EPON, and said user port is a user network interface (UNI).

Figure 1:
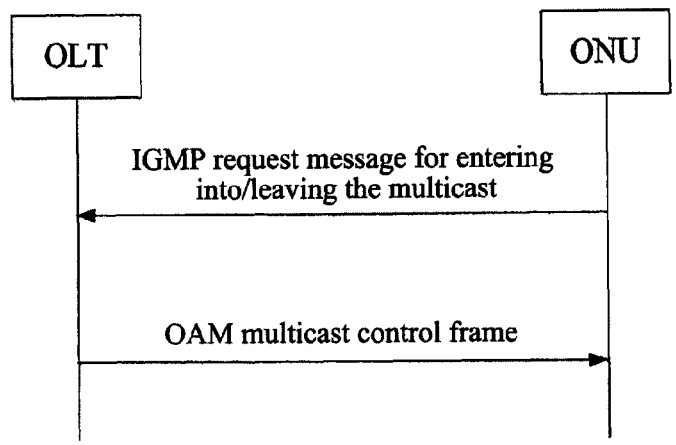
FIG. 1 is a flow chart of signaling interaction between ONU and OLT in accordance with the method of the present invention.

FIG. 1 is a flow chart of signaling interaction between the ONU and the OLT in the method of the present invention. Referring to FIG. 1, in the embodiment, the present invention bases on the idea of centralized control, and instead of judging the user multicast authority, the ONU sends an IGMP request message, such as an IGMP request message for entering into a multicast and an IGMP request message for leaving the multicast, to the OLT which performs control according to the multicast authority table and returns the result to the ONU through an extended OAM multicast control frame, and only after the ONU receives the OAM multicast control frame from the OLT does it generates an item in the multicast filter table and an item in the user filter table.

One PON port of the OLT in EPON may connect a plurality of ONUs, each of which has a plurality of UNIs. In order to perform user identification in the OLT, the present invention marks a plurality of users (UNI) in one ONU through a Custom Virtual Local Area Network Identity (CVLAN ID) besides of marking the ONU through a general Logical Link Identity (LLID) of EPON. CVLAN is VLAN information in a user request message, and for a user request message without the VLAN information, such as an untagged message, the CVLAN ID is a Port Vlan Identity (PVID) of the UNI.

After the OLT receives a IGMP request message, it searches the user's multicast authority table according to the LLID and CVLAN ID in the request message to judge whether the user has the multicast authority or not, sends the processing result, such as allowing it to access to a multicast or denying it to access to the multicast, to the corresponding ONU through the OAM multicast control frame, and after the ONU receives the OAM multicast control frame, it establishes a relative control table item, that is, an item in a multicast data filter and an item in the user filter table.

Figure 2:
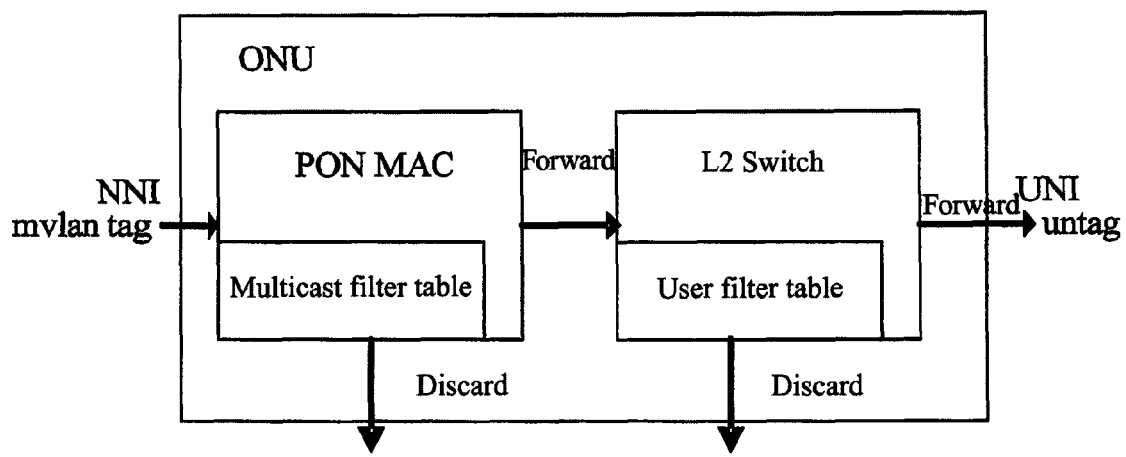
FIG. 2 is an illustration of forwarding function of the EPON ONU.

FIG. 2 is an illustration of forwarding function of EPON ONU. Referring to FIG. 2, EPON ONU generally has a PON MAC and a L2 Switch. Since EPON involves Virtual Local Area Network (VLAN) technology, a multicast data received at the ONU's Network-Network Interface (NNI) is a multicast VLAN data having tag (MVLAN tag), and the multicast data sent out from the UNI in the ONU is an untagged multicast data, since how to add or delete a tag is not the main point of the present invention, the process is not to be described in detail here.

Said PON MAC and L2 Switch are all need to be controlled for the controllable multicast service in present invention: a multicast filter table is set in the PON MAC and the table has an item of multicast IP address which mainly filters the multicast data according to the multicast IP address recorded in the table, and when it receives the multicast data from the NNI, the PON MAC only forwards the multicast data corresponding to the multicast IP address recorded in the multicast filter table and discards those corresponding to the multicast IP address not recorded in the table; a user filter table, also referred to as L2 Switch multicast forwarding table, is set in the L2 Switch, in which the multicast VLAN ID, the multicast MAC address and the UNI ID are configured, wherein the MAC address is obtained through the multicast IP address mapping, and the L2 Switch receives the multicast data filtered and forwarded by the PON MAC, maps the multicast IP address of the multicast data as the MAC address, searches said user filter table and forwards said multicast data to the UNI corresponding to the multicast MAC address recorded in the user filter table.

Under the initial condition, said user filter table is blank, therefore, the L2 Switch discards an unknown multicast data under the initial condition.

Figures 3, 4:
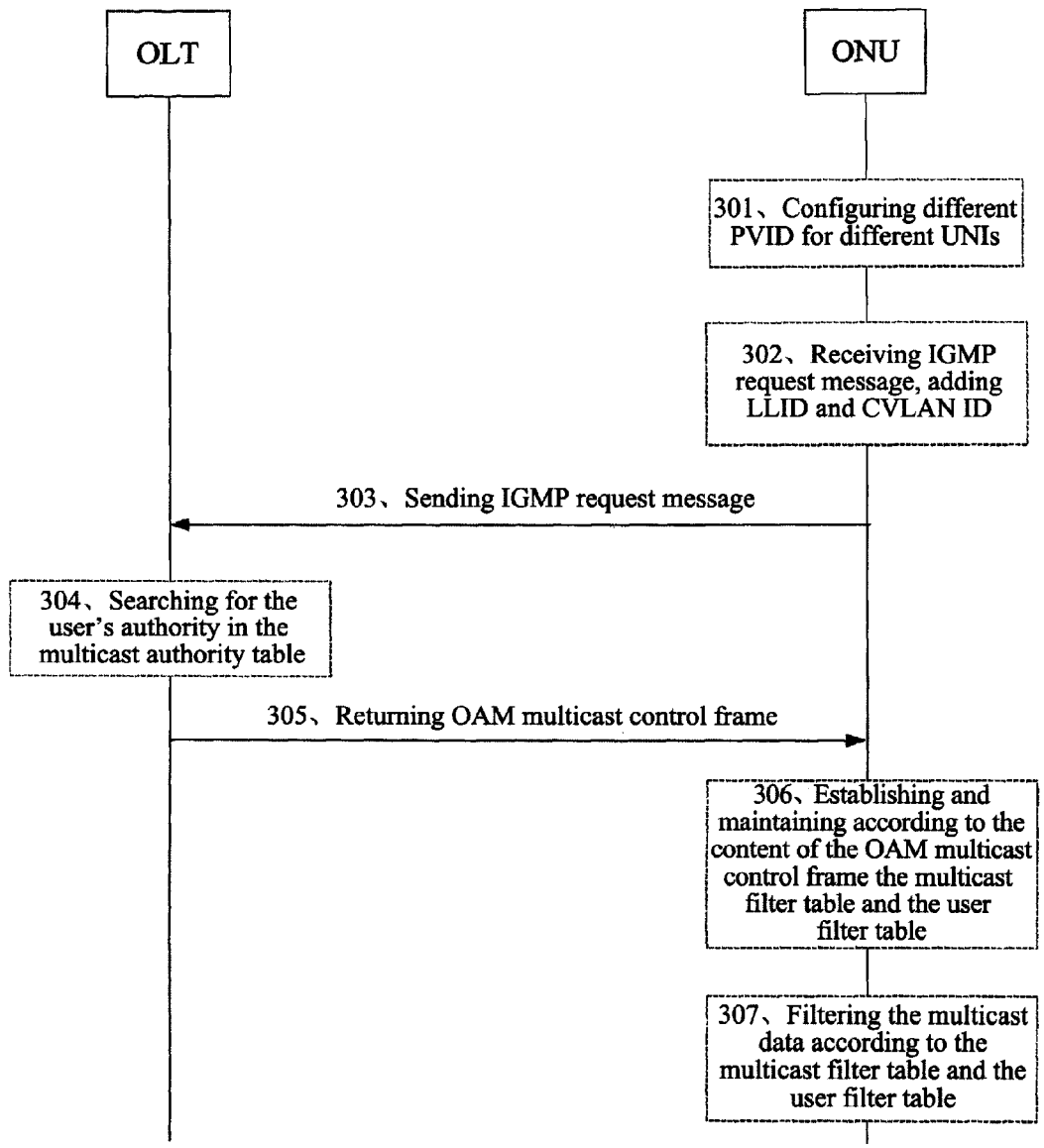
FIG. 3 is a flow chart of implementing multicast control in EPON in accordance with the present invention.
FIG. 4 is an illustration of composition structure of said extended OAM multicast control frame in accordance with the present invention.

FIG. 3 is a flow chart of implementing multicast control in EPON. Referring to FIG. 3, the process comprises:

Step 301, configuring different UNIs of the ONU with different PVIDs.

Step 302, the ONU receiving the multicast request message with multicast ID, that is, the IGMP request message which is untagged IGMP request message here, from the UNI, and adding UNI ID into the IGMP request message, that is, adding CVLAN tag into the IGMP request message, here, the value of the CVLAN tag is the predetermined UNI PVID, and said CVLAN tag is the above-mentioned CVLAN ID; meanwhile, adding the ONU's LLID into the IGMP request message.

Step 303, the ONU sending the IGMP request message carrying the ONU's LLID information and said CVLAN tag information to the OLT.

Step 304~305, the OLT locating the IGMP request to the ONU UNI according to the CVLAN tag in the received IGMP request message with combination of the LLID of the ONU, searching the predetermined multicast authority table, and returning the extended OAM multicast control frame to the corresponding ONU if it finds out that the user marked by said CVLAN tag and LLID has the requested multicast authority; otherwise, that is, the user marked by said CVLAN tag and LLID does not have the requested multicast authority, it denies to accept said IGMP request.

FIG. 4 is an illustration of composition structure of the extended OAM multicast control frame in accordance with the present invention. Referring to FIG. 4, said OAM multicast control frame comprises: type information, accounting for 1 byte; multicast VLAN ID, accounting for 2 bytes; multicast group IP address, accounting for 4 byte; and said CVLAN ID, accounting for 2 byte. Said multicast group IP address is the multicast IP address. Said type information is used to identify whether said IGMP request message is a request for entering into the multicast or leaving the multicast.

Step 306, after the ONU receives the OAM multicast control frame, it establishes and maintains a multicast filter table including said multicast IP address according to the content of the OAM multicast control frame and a user filter table including said multicast VLAN ID, multicast MAC address, as well as its corresponding UNI ID.

Step 306 specifically comprises: judging the type information of said OAM multicast control frame and if the type information shows that said IGMP request message is a request for entering into the multicast, an item of said multicast IP address in the multicast filter table is established in the PON MAC layer to map said multicast IP address as the MAC address, and an item of said multicast VLAN ID, the multicast MAC address and the UNI ID in the user filter table is established in the L2 Switch, proceed to step 307; if said type information shows that said IGMP request message is a request for leaving the multicast, the item corresponding to the UNI marked by said CVLAN ID in said OAM multicast control frame is deleted from the user filter table in L2 Switch, after that, judging whether there is an item corresponding to the multicast ID carried in said OAM multicast control frame in the user filter table in the L2 Switch or not, if yes, proceeding to step 307, otherwise, deleting the item of multicast IP address corresponding to the multicast ID carried in said OAM multicast control frame in said multicast filter table, and proceeding to step 307.

Step 307, filtering the multicast data according to the multicast filter table and the user filter table. It is specified as: when the ONU receives the multicast data, it searches said multicast filter table, and when the multicast IP address of said multicast data is recorded in said multicast filter table, it maps the multicast IP address as the MAC address, and then searches said user filter table and forwards the multicast data to the UNI corresponding to said multicast MAC address recorded in the user filter table.

The method of the present invention will be further described in the following through an example carrying specific data.

Suppose the multicast VLAN ID is 2, the multicast IP address is 224.1.1.1;

For an ONU with several UNIs, each UNI is configured with a different PVID, for example:

Port 1: PVID=100;
Port 2: PVID=200;
Port 3: PVID=300.

When the ONU receives an untagged IGMP request message with multicast IP address 224.1.1.1 for entering into the multicast, it adds a tag of 100 into the IGMP request message according to the PVID to make it as the CVLAN ID of Port 1, and adds LLID to the present ONU and sends it to the OLT for processing. The OLT judges whether the user port requesting for multicast has the authority or not according to said multicast authority table, and returns the OAM multicast control frame if yes. After the ONU receives the OAM multicast control frame returned from the OLT, it establishes an item of multicast IP address 224.1.1.1 in the multicast filter table in the PON MAC, and establishes the following item in the user filter table in the L2 Switch, that is, the table item of L2 Switch multicast forward:

VID=2, MAC=01:00:5e:01:01:01, port=1.

Wherein VID indicates the VLAN ID of the multicast, the value of MAC is obtained through mapping the multicast IP address, and port indicates the port number.

When the ONU receives the multicast data with multicast IP address 224.1.1.1, it first searches the multicast filter table, and if it is allowed to through, searches the user filter table and forwards the multicast data to port 1.

When the ONU receives the untagged IGMP request message with multicast IP address 224.1.1.1 for entering into the multicast at port 2, it adds a tag of 200 into it according to the PVID to make it as the CVLAN ID of port 2, adds the LLID to the present ONU and sends it to the OLT for processing. The OLT judges whether the user port requesting for the multicast has the authority or not according to said multicast authority table, and returns the OAM multicast control frame if yes. After the ONU receives the OAM multicast control frame returned from the OLT, it establishes an item of multicast IP address in the multicast filter table, and establishes the following item in the user filter table in L2 Switch:

VID=2, MAC=01:00:5e:01:01:01, port=2.

When the ONU receives the multicast data with multicast IP address 224.1.1.1, it first searches the multicast filter table, and if it is allowed to through, searches the user filter table and forwards multicast data to port 1 and port 2.

When the ONU receives an untagged IGMP request message with multicast IP address 224.1.1.1 for leaving the multicast at port 1, it adds an CVLAN tag of 100 into it according to the PVID to make it as the CVLAN ID of port 1, adds LLID to the present ONU and sends it to the OLT for processing, and the OLT judges whether the user port requesting for multicast has the authority or not according to said multicast authority table, and returns the OAM multicast control frame if yes. After the ONU receives the OAM multicast control frame returned from the OLT, it first deletes the item corresponding to port 1 in the user filter table in said L2 Switch, and then determines that there is record corresponding to port 2 in the user filter table, thus it does not delete the item in the multicast address filter table.

When the ONU receives the multicast data with multicast IP address 224.1.1.1, it first searches the multicast address filter table and if it is allowed to through, searches the user filter table and only forwards the multicast data to port 2.

When the ONU receives an untagged IGMP request message with multicast IP address 224.1.1.1 for leaving the multicast at port 2, it adds an CVLAN tag of 100 into it according to the PVID to make it as the CVLAN ID of port 1, adds LLID to the present ONU and sends it to the OLT for processing, and the OLT judges whether the user port requesting for the multicast has the authority or not according to said multicast authority table, and returns the OAM multicast control frame if yes. After the ONU receives the OAM multicast control frame returned from the OLT, it first deletes the item corresponding to port 1 in the user filter table in said L2 Switch, and then determines that there is no record corresponding to other ports in the user filter table, thus it deletes the item of multicast IP address in the multicast address filter table.

When the ONU receives the multicast data with multicast IP address 224.1.1.1, it first searches the multicast address filter table and directly discards the multicast data.

The above description is only preferred embodiments of the present invention, but the present invention may have several other embodiments, and without departing from the spirit and essence of the present invention, those skilled in the field can make all kinds of modification or variations which should belong to the scope of the claims of the present invention.

INDUSTRIAL APPLICABILITY

The present invention offers a multicast control method in EPON, which performs multicast control for different user ports in the same user-end device through modifying the definition of multicast authority as well as modifying the one level multicast filter in the user-end device to two level filters: multicast filter and user filter, improve the accuracy and security of the multicast control. The present invention can be used by several kinds of user-end devices to offer a more complete solution for EPON controllable multicast and extend the popularity of multicast service in EPON.

What we claim is:

1. A method for controlling a multicast in an Ethernet Passive Optical Network, comprising steps of:

A, configuring different identities for a user-end device and its user ports; marking a user with a user-end device identity and a user port identity in a central office device and setting a user's multicast authority table according to the user-end device identity and the user port identity;

B, controlling a user's multicast authority in the central office device according to said multicast authority table; sending, by the central office device, a multicast control frame carrying a multicast identity and said user port identity to the user-end device when the central office device determines the user has a multicast authority; setting a multicast filter table and a user filter table in the user-end device corresponding to the user according to a content of the multicast control frame, and filtering by the user-end device multicast data and forwarding the filtered multicast data to a user with a multicast authority according to said multicast filter table and user filter table;

wherein said step B specifically comprises:

B1, the user-end device receiving at a user port a request message carrying an multicast identity, adding the user-end device identity and said user port identity into the request message and then sending the request message to the central office device;

B2, the central office device receiving said request message and searching the multicast authority table, when the user marked by the user-end device identity and the user port identity in said request message is found having the multicast authority, returning the multicast control frame carrying said multicast identity and said user port identity to the user-end device;

B3, after the user-end device receives said multicast control frame, according to said multicast identity and said user port identity carried by the multicast control frame, establishing and maintaining the multicast filter table including said multicast identity, and establishing and maintaining the user filter table including said multicast identity and corresponding user port identity; and B4, when the user-end device receives multicast data, searching said multicast filter table and then, when an identity of the multicast to which the multicast data belong is recorded in said multicast filter table, searching said user filter table, and forwarding the multicast data to the user port corresponding to the identity of the multicast recorded in the user filter table.

2. A method of claim 1, wherein when said request message is a request message for entering into the multicast, said step B3 is:

the user-end device obtaining the multicast identity and user port identity from said multicast control frame, establishing in the multicast filter table in the user-end device an item including the multicast identity, and establishing in the user filter table an item including said multicast identity and the user port identity.

3. A method of claim 1, wherein when said request message is a request for leaving the multicast, said step B3 is:

the user-end device obtaining the multicast identity and user port identity from said multicast control frame, and deleting from said user filter table the item corresponding to said user port identity;

searching said user filter table, judging whether there is the item corresponding to the multicast identity therein or not, if yes, performing step B4, otherwise, deleting from the multicast filter table the item corresponding to the multicast identity, and performing step B4.

4. A method of claim 1, wherein said multicast control frame specifically comprises:

a frame type information used to distinguish whether the message request is a request for entering into the multicast or leaving the multicast, a multicast Virtual Local Area Network identity, a multicast Internet Protocol address and the user port identity.

5. A method of claim 4, wherein the multicast identity in said multicast filter table is the multicast Internet Protocol address; the multicast identity in said user filter table is the multicast Virtual Local Area Network identity and a Media Access Control address mapped by the multicast Internet Protocol address.

6. A method of claim 1, wherein said identity configured for the user-end device is a logic link identity; said identity configured for the user port is a custom Virtual Local Area Network identity.

7. A method of claim 1, wherein the setting the multicast filter table and user filter table in the user-end device is:

setting said multicast filter table in Passive Optical Network Media Access Control portion in the user-end device and setting the user filter table in a L2 Switch portion in the user-end device.

8. A method of claim 1, wherein said user-end device is an optical network unit, and said central office device is an optical line terminal.

9. A method of claim 2, wherein said identity configured for the user-end device is a logic link identity; said identity configured for the user port is a custom Virtual Local Area Network identity.

10. A method of claim 3, wherein said identity configured for the user-end device is a logic link identity; said identity configured for the user port is a custom Virtual Local Area Network identity.

11. A method of claim 4, wherein said identity configured for the user-end device is a logic link identity; said identity configured for the user port is a custom Virtual Local Area Network identity.

12. A method of claim 2 wherein the setting the multicast filter table and user filter table in the user-end device is:
   setting said multicast filter table in Passive Optical Network Media Access Control portion in the user-end device.

13. A method of claim 3, wherein the setting the multicast filter table and user filter table in the user-end device is:
   setting said multicast filter table in Passive Optical Network Media Access Control portion in the user-end device.

14. A method of claim 4, wherein the setting the multicast filter table and user filter table in the user-end device is:
   setting said multicast filter table in Passive Optical Network Media Access Control portion in the user-end device.

15. A method of claim 2, wherein said user-end device is an optical network unit, and said central office device is an optical line terminal.

16. A method of claim 3, wherein said user-end device is an optical network unit, and said central office device is an optical line terminal.

* * * * *